United States Patent [19]

Tabe

[11] Patent Number: 5,228,704
[45] Date of Patent: Jul. 20, 1993

[54] VEHICLE HEIGHT CONTROL SYSTEM AFTER IGNITION SWITCH IS TURNED OFF

[75] Inventor: Masahiko Tabe, Hadano, Japan

[73] Assignee: Nissan Motor Co., Ltd., Yokohama, Japan

[21] Appl. No.: 884,337

[22] Filed: May 18, 1992

[30] Foreign Application Priority Data

May 24, 1991 [JP] Japan .................. 3-120105

[51] Int. Cl.$^5$ .............................................. B60S 9/00
[52] U.S. Cl. .................... 280/6.1; 280/6.11; 280/707; 280/840
[58] Field of Search ............. 280/840, 6.12, 6.1, 280/707

[56] References Cited

U.S. PATENT DOCUMENTS

| | | | |
|---|---|---|---|
| 4,349,077 | 9/1982 | Sekiguchi et al. | 280/707 |
| 5,046,754 | 9/1991 | Kimura et al. | 280/707 |
| 5,130,927 | 7/1992 | Kunishima et al. | 280/707 |

FOREIGN PATENT DOCUMENTS

| | | | |
|---|---|---|---|
| 58-95307 | 6/1983 | Japan . | |
| 2-299916 | 12/1990 | Japan | 280/840 |
| 4-126616 | 4/1992 | Japan . | |

Primary Examiner—Eric D. Culbreth
Attorney, Agent, or Firm—Lowe, Price, LeBlanc & Becker

[57] ABSTRACT

A vehicle height control system is provided. This height control system is directed to establish fluid communication between right and left suspension actuators or between front and rear suspension actuators, balancing fluid pressures in the actuators for leveling a vehicle body when height level difference between right and left wheels or between front and rear wheels is greater than a first threshold value within a given period of time after an ignition switch is turned off. The height control system then blocks the fluid communication when the height level difference lower than a second threshold value smaller than the first threshold value is maintained for a preselected period of time for preventing the fluid communication between the actuators from being blocked, and instantaneously terminating the height control when the height level difference becomes smaller than the second threshold value due to variation in vehicle load caused by passengers getting in or out of a vehicle and/or baggage loaded into or unloaded from a baggage compartment.

3 Claims, 5 Drawing Sheets

VEHICLE HEIGHT CONTROL SYSTEM AFTER IGNITION SWITCH IS TURNED OFF

BACKGROUND OF THE INVENTION

1. Field of The Invention

The present invention relates generally to a height control system for a vehicle. More particularly, the invention is directed to a height control system which serves to level a vehicle body after an ignition switch is turned off to deactivate a fluid power source for suspension units.

2. Description of The Background Art

Japanese Utility Model Publication No. 58-95307 discloses a height control system for a vehicle utilizing electronically controlled air suspension units. These air suspension units include air chambers filled with compressed air and shock absorbers for adjusting height levels between a vehicle body and wheels respectively. The height level adjustment is accomplished by supplying compressed air from an air source to the air chambers through height control valves or draining the compressed air in the air chambers for leveling the vehicle body at a standard height value.

However, in such a conventional height control system, operating a compressor for supplying air to air suspensions to increase a height level is undesirable after an ignition switch is turned off to stop an engine since a battery may be undesirably drained. For example, when height difference between left and right wheels exists after the ignition switch is turned off, the conventional height control system drains compressed air from an air chamber of higher pressure to modify a higher height level to agree with a lower height level, reducing the height difference between the left and right wheels. Therefore, when the lower height level is below a standard height value, when the height difference is neutralized, height levels at both left and right wheels result in a level undesirably lower than the standard height value.

SUMMARY OF THE INVENTION

It is therefore a principal object of the present invention to avoid the disadvantages of the prior art.

It is another object of the invention to provide a height control system for a vehicle which serves to balance vehicle height levels at left and right wheels or at front and rear wheels within a range adjacent a standard height level after an ignition switch is turned off to deactivate a fluid source of the system.

It is a further object of the invention to provide a height control system for a vehicle which deactivates height control when vehicle height levels at left and right wheels or at front and rear wheels are balanced so that the height level difference within a given range is maintained for a preselected period of time required for preventing the height control from terminating under the condition that the height level difference enters within the given range instantaneously due to variation in vehicle load caused by passengers getting in or out of the vehicle and/or baggage loaded into or unloaded from a baggage compartment.

According to one aspect of the present invention, there is provided a first suspension unit including a first actuator for adjusting a vehicle height level between a vehicle body and a first wheel, the first actuator being adjustable of fluid pressure therein, a second suspension unit including a second actuator for adjusting a vehicle height level between the vehicle body and a second wheel, the second actuator being adjustable of fluid pressure therein, fluid power source means for supplying fluid pressure to the first and second actuators of the first and second suspension units, a first valve for controlling the fluid pressure supplied from the fluid power source means to the first actuator, a second valve for controlling the fluid pressure supplied from the fluid power source means to the second actuator, a fluid circuit connecting between the fluid power source and the first and second actuators, the fluid circuit including a fluid line communicating between the first and second actuators through the first and second valves, first sensor means for detecting a deactivated state of the power source means to provide a signal indicative thereof, second sensor means for determining a height level difference between the first and second wheels to provide a signal indicative thereof; and control means responsive to the signals from the first and second sensor means to provide first control signals to the first and second valves respectively to communicate between the first and second actuators balancing the fluid pressures in the first and second actuators when the height level difference is greater than a first threshold value within a first period of time following deactivation of the power source means, the control means further providing second control signals to the first and second valves to block the communication between the first and second actuators when the height level difference lower than a second threshold value which is smaller than the first threshold value is maintained for a second period of time.

DESCRIPTION OF THE PREFERRED EMBODIMENT

Figure 1:
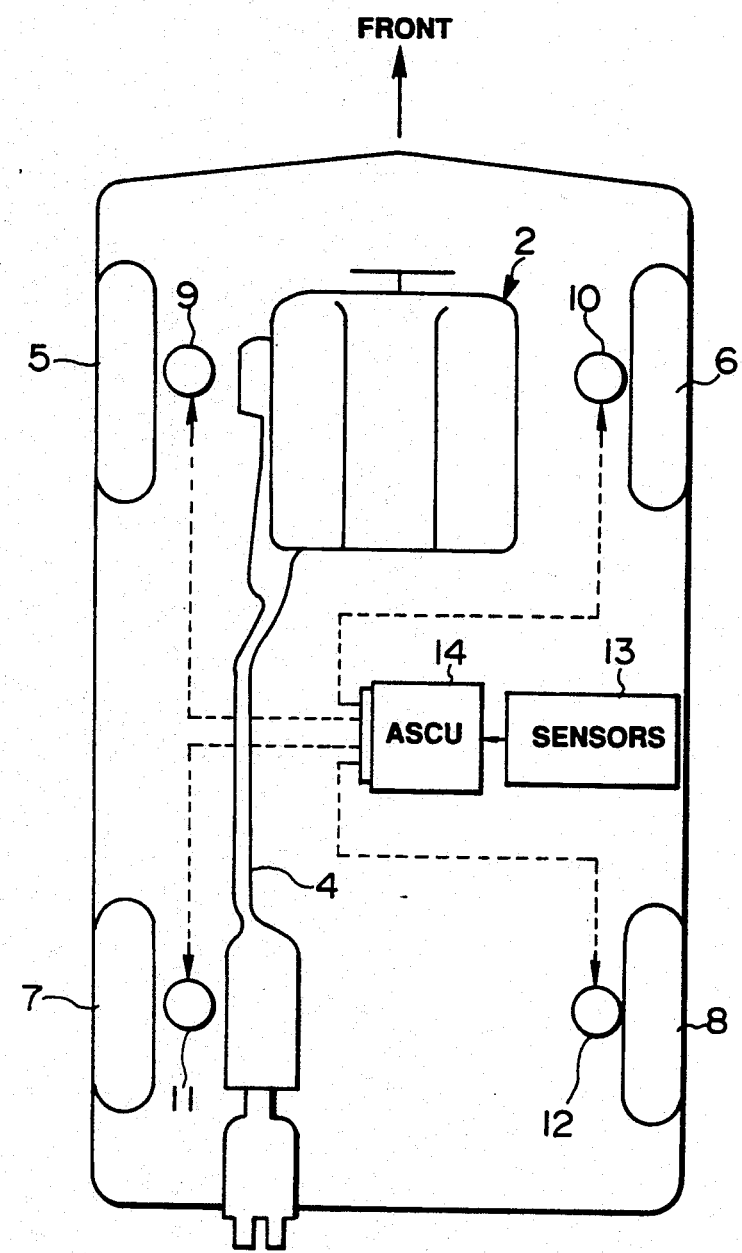
FIG. 1 is a schematic view which shows a vehicle incorporating a height control system according to the present invention.

Referring now to the drawings, particularly to FIG. 1, there is shown an automotive vehicle which includes generally an engine 2, an exhaust system 4, and a height control system according to the present invention. The height control system includes four suspension units 9, 10, 11, and 12 disposed between a vehicle body and suspension members rotatably supporting wheels 5, 6, 7, and 8 respectively, an air suspension control unit 14, and a plurality of sensors 13 as will be described hereinafter in detail. The height control system serves to adjust height levels between the vehicle body and front-left, front-right, rear-left, and rear-right wheels 5, 6, 7 and 8, independently of each other.

Figure 2:
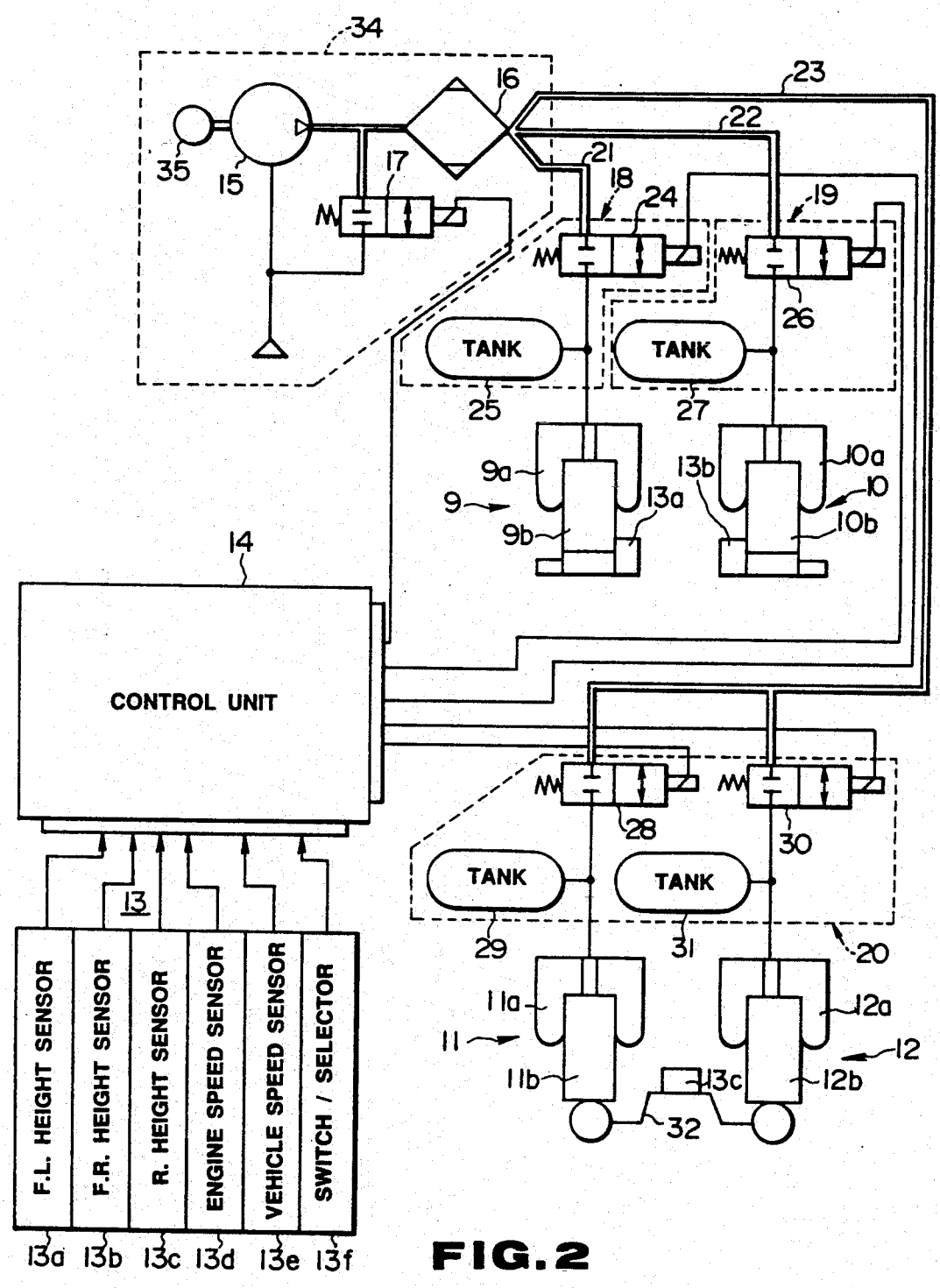
FIG. 2 is a schematic view which shows a height control system of the present invention.

Referring to FIG. 2, the height control system is shown. The height control system, as described above, includes suspension units 9, 10, 11, and 12. These suspension units function as actuators which include fluid chambers 9a, 10a, 11a, and 12a such as air chambers filled with compressed air and shock absorbers 9b, 10b, 11b, and 12b. The height control system is operable to regulate pressure or an amount of compressed air in the air chambers 9a, 10a, 11a, and 12a to control vehicle height levels at the wheels 5, 6, 7, and 8 separately. The height control system further includes a fluid power source such as an air source 34 which comprises a compressor 15 for supplying compressed air required for increasing vehicle height, a motor 35 for driving the compressor 15, a dryer 16 for dehydrating the air in a circuit line, and an exhaust valve 17 openable for draining the compressed air in the air chambers 9a, 10a, 11a, and 11a to the outside, lowering the vehicle height toward a standard height value. The dryer 16 is connected to a front-left wheel air circuit 18, a front-right wheel air circuit 19, and a rear wheel air circuit 20 through air lines 21, 22, and 23 respectively. The front-left wheel air circuit 18 includes a front-left suspension valve 24, such as a pressure control valve or a flow control valve, operable to control air pressure supplied to the air chamber 9a in vehicle height adjustment and a front-left sub-tank 25. Likewise, the front-right wheel air circuit 19 includes a front-right suspension valve 26 and a front-left sub-tank 27. The rear-wheel air circuit 20 also includes rear-left and rear-right suspension valves 28 and 30 and rear-left and rear-right sub-tanks 29 and 31.

The height control system further includes front-left and front-right height sensors 13a and 13b, a rear height sensor 13c, an engine speed sensor 13d for detecting speed of the engine 2, a vehicle speed sensor 13e for detecting vehicle speed, and other switches and a selector 13f such an ignition switch, a parking brake switch, and a vehicle height level selector.

The front-left and front-right height sensors 13a and 13b are installed on the front suspension members respectively for detecting vehicle height levels at the front-left and front-right wheels 5 and 6. The rear height sensor 13c is mounted on the central portion of a rear stabilizer for monitoring an amount of torsion of the stabilizer to determine a height level difference between the rear wheels 7 and 8.

As mentioned above, the suspension units (9-12) utilize air suspension, however, the suspension units may alternatively be provided with a hydraulic suspension including a hydraulic cylinder.

The air suspension control unit 14 is responsive to the signals from the sensors 13a to 13e, the switches, and the selector 13f to provide leveling control signals to the valves 17, 24, 26, 28, and 30 respectively to effect height adjustment so that vehicle height is leveled at a predetermined height selected by the vehicle height level selector 13f. The control unit 14 is further operable to provide leveling control signals to the suspension valves 24 and 26 respectively to fluidly communicate between the air chambers 9a and 10a through the air pipes 21 and 22, balancing pressures in the air chambers 9a and 10a when a height level difference $\Delta hf$ between the front-left and front-right wheels 5 and 6 greater than or equal to a preselected threshold value $\Delta Hf_0$ is kept for a preselected period of time $tf_0$ within three minutes following turning off operation of the ignition switch 13f deactivating a driving means, or the motor 35 for the compressor 15.

Figure 3:
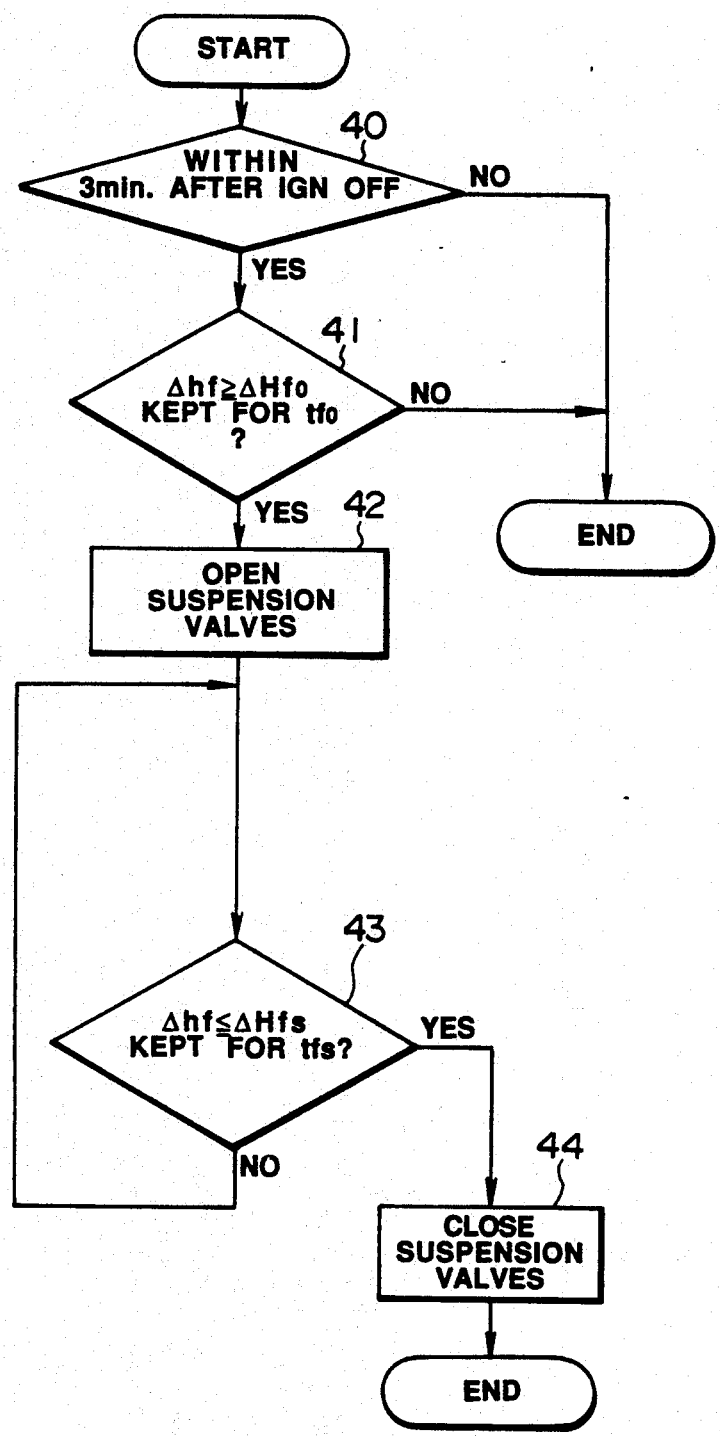
FIG. 3 is a flowchart which shows logical steps performed by a suspension control unit of a height control system.

Referring to FIG. 3, there is shown a flowchart of a program or sequence of logical steps performed by the air suspension control unit 14.

After entering the program, the routine proceeds to step 40 wherein it is determined whether a period of time following ignition turning off operation is within three minutes or not. The reason for providing a time interval of three minutes is that loading and unloading baggage or getting in and out of a vehicle of passengers may usually be considered to be finished within three minutes following turning off operation of the ignition switch. If a YES answer is obtained in step 40, the routine then proceeds to step 41 wherein it is determined whether the height level difference $\Delta hf$ between the front-left and front-right wheels 5 and 6 greater than or equal to the preselected threshold value $\Delta Hf_0$ (i.e., 6 mm) is kept longer than the preselected period of time $tf_0$ (i.e., 10 seconds) or not.

The reason for providing step 41 is to prevent instantaneously height control, as described below, from being effected erroneously when the height level difference $\Delta hf$ exceeds the height control initial threshold value $\Delta Hf_0$ due to variation in vehicle load caused by passengers getting in or out of a vehicle and/or baggage loaded into or unloaded from a baggage compartment.

If a YES answer is obtained in step 41, the routine then proceeds to step 42 wherein leveling control signals are output to the front suspension valves 24 and 26 to open these for establishing fluid communication between the air chambers 9a and 10a of the front suspension units 9 and 10 through the air pipes 21 and 22, balancing internal pressures thereof. Afterward, the routine proceeds to step 43 wherein it is determined whether the height level difference $\Delta Hf$ between the front-left and front-right wheels 5 and 6 smaller than or equal to a preselected threshold value $\Delta Hfs$ is maintained longer than a preselected period of time tfs, or not. The threshold value $\Delta Hfs$ is 2 mm, for example, which is smaller than the threshold value $\Delta Hf_0$.

The reason for providing the determination in step 43 is to prevent the pressure balancing control in step 42 from terminating instantaneously when the height level difference $\Delta hf$ becomes smaller than the height control terminating threshold value $\Delta Hfs$ due to variation in vehicle load caused by passengers getting in or out of a vehicle and/or baggage loaded into or unloaded from a baggage compartment.

If a NO answer is obtained in step 43, the routine then repeats step 43 until the condition $\Delta hf \leq \Delta Hfs$ is satisfied, outputting control signals to the suspension valves 24 and 26 to maintain same opened. If a YES answer is obtained in step 43, the routine then proceeds to step 44 wherein control signals are output to the front suspension valves 24 and 26 to close them for blocking the fluid communication between the air chambers 9a and 10a.

It will be appreciated that when one of the front-left and the front-right wheels 5 and 6 runs onto a sidewalk for example with a certain height difference between the front wheels, and this height difference remains just after a vehicle moves onto an even road and then the ignition switch is turned off to stop the engine 2 and the compressor 15, the suspension valves 24 and 26 are opened to balance pressures in air chambers 9a and 10a after satisfying the conditions in steps 40 and 41. Therefore, when a height level at one of the front-left and the front-right wheels 5 and 6 is lower than or equal to a preselected standard height value with a height level higher than the standard height value at the other wheel, opening the suspension valves 24 and 26 causes internal pressure of the air chamber 9a (or 10a) associated with the wheel of the lower height level is increased by the pressure in the air chamber 10a (or 9a) associated with the wheel of the higher height level, balancing the pressures in both air chambers 9a and 10a.

With the above balancing pressure control, the height level lower than the standard height value is increased, while height level higher than the standard height value is decreased with the result that height levels at the front-left and front-right wheels 5 and 6 are substantially equal to each other. The height levels at both front wheels 5 and 6 are maintained at a level near the standard height value. Additionally, the height control system does not utilize compressed air supplied from the compressor 15 after the ignition switch is turned off, preventing a battery from being discharged completely.

Figure 4:
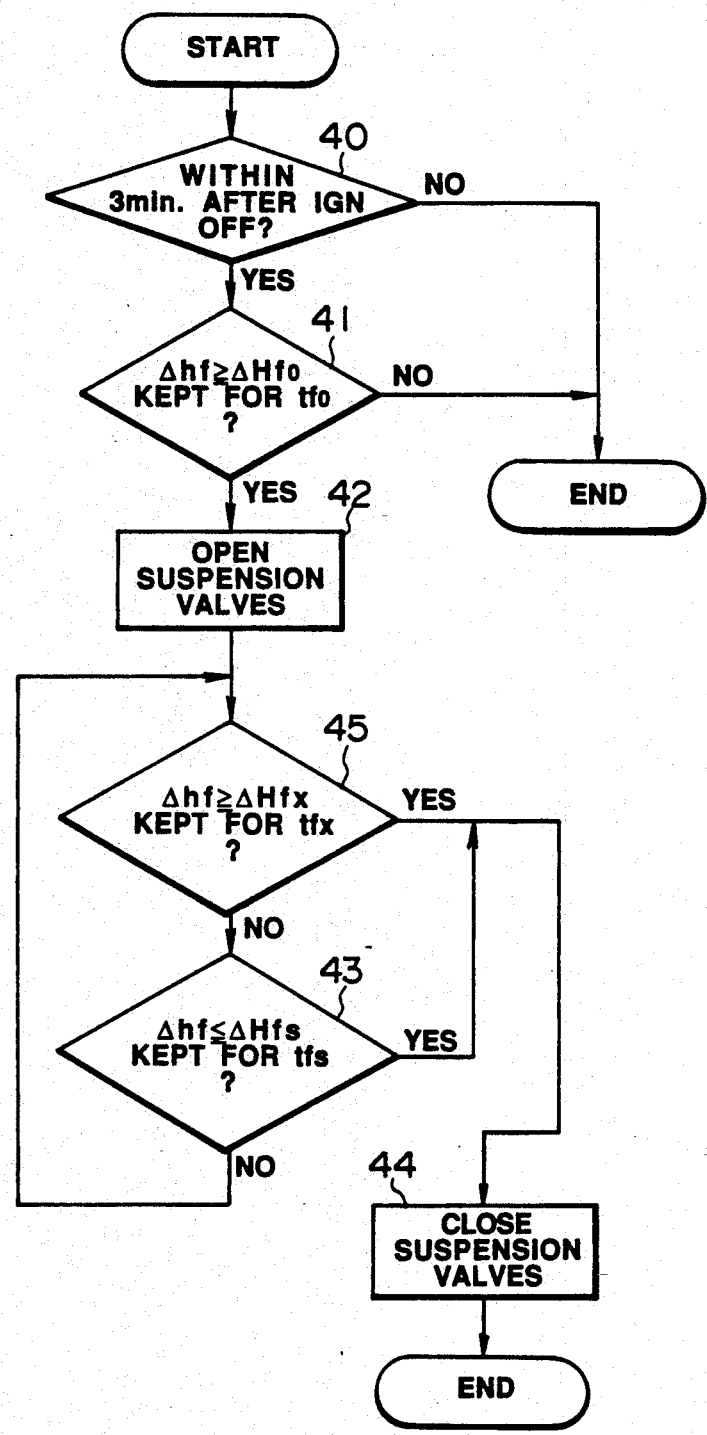
FIG. 4 is an alternate flowchart which shows a program performed by a suspension control unit.

Referring to FIG. 4, a flowchart of an alternate program which may be performed by the air suspension control unit 14 is shown. This flowchart is different from the flowchart in FIG. 3 only in providing step 45, as described below, between steps 42 and 43. Other steps are similar to those in FIG. 3 and thus explanation thereof in detail will be omitted here.

In step 45, it is determined whether a height level difference $\Delta hf$ at the front-left and the front-right wheels 5 and 6 greater than or equal to a preselected height control deactivation threshold value $\Delta Hfx$ is maintained for a preselected period of time tfx or not. The height control deactivation threshold value $\Delta Hfx$ is derived by the following relation.

$$\Delta Hfx = \Delta hf_0 + \alpha$$

Where $\Delta hf_0$ is a height level difference at the beginning of the pressure balancing control to provide leveling control signals to the suspension valves 24 and 26 and $\alpha$ is a constant, 2 mm for example.

It will be noted that step 45 is to determine whether the height level difference $\Delta hf$ at the front wheels 5 and 6 after the pressure balancing control becomes greater than the height level difference $\Delta Hf_0$ just after the height control if effected. For example, when the height level difference $\Delta hf$ between the front wheels 5 and 6 is maintained relatively small during parking on an inclined road with high internal pressure of one of the air chambers 9a and 10a due to passengers occupying seats at either of the sides only and/or baggage loaded on either side in a baggage compartment, carrying out the pressure balancing control in step 42 until both pressures in the air chambers 9a and 10a are balanced completely causes a height level at the wheel associated with the air chamber which had been maintained at a higher pressure to be decreased, resulting in the height level difference $\Delta hf$ being greater than that at the beginning of the pressure balancing control.

Thus, if a YES answer is obtained in step 45 concluding that the height level difference $\Delta hf$ between the front-left and the front-right wheels 5 and 6 more than or equal to the preselected height control deactivation threshold value $\Delta Hfx$ is maintained for the preselected period of time tfx which is required for preventing the pressure balancing control in step 42 from terminating when the height level difference $\Delta hf$ becomes greater than the height control deactivation threshold value $\Delta Hfx$ due to variation in vehicle load caused by passengers getting in or out of a vehicle and/or baggage being loaded into or unloaded from a baggage compartment, the routine then proceeds to step 44 directly without consideration of the condition in step 43, providing control signals to the suspension valves 24 and 26 to close these.

Figure 5:
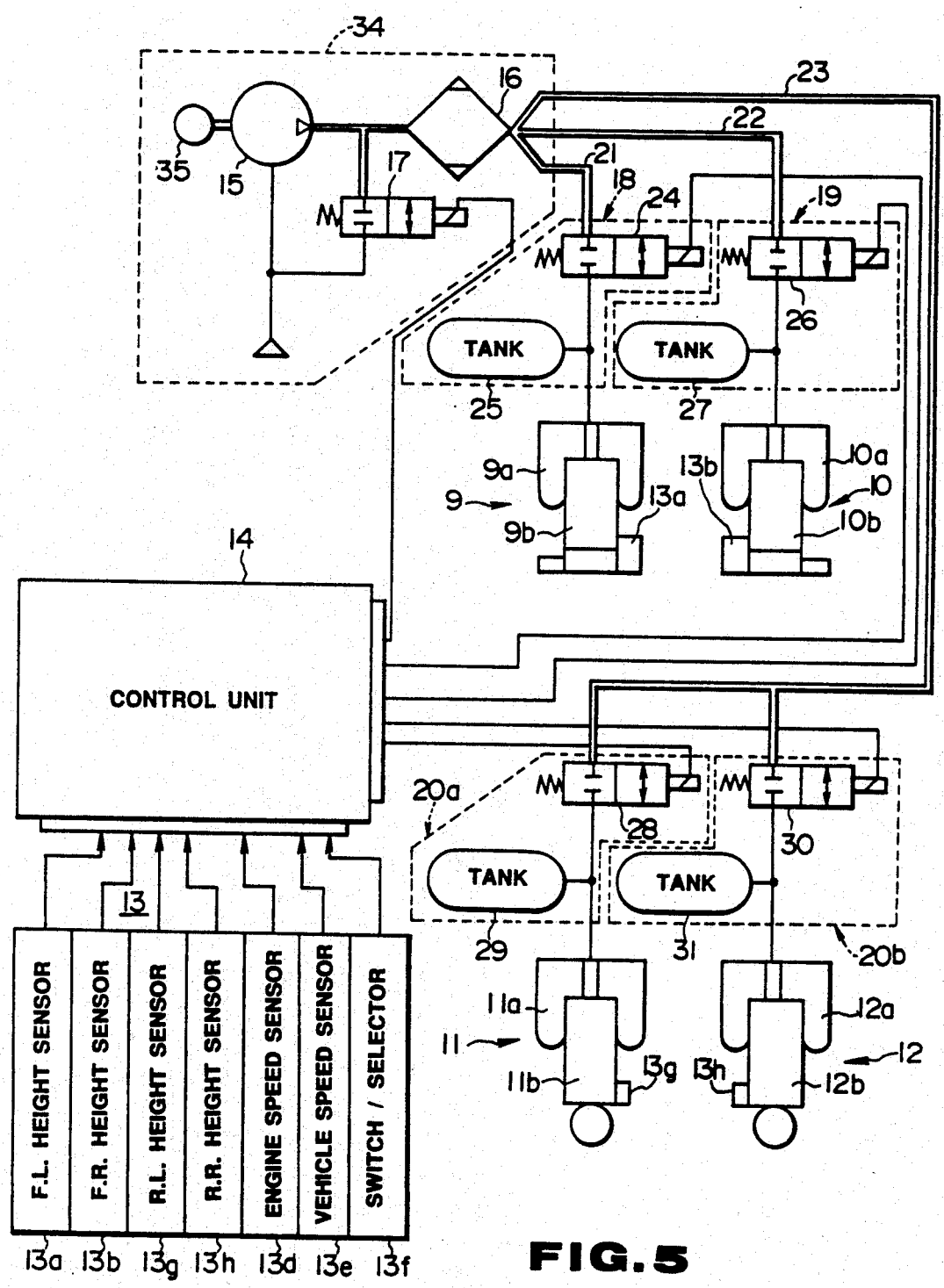
FIG. 5 is schematic view which shows an alternate height control system according to the present invention.

Referring to FIG. 5, an alternative embodiment is shown. A height control system of this embodiment is directed to adjust height levels of a vehicle body at rear wheels 7 and 8 as well as at front wheels 5 and 6 independently of each other.

The height control system is different from the system shown in FIG. 2 in providing separate rear height sensors 13g and 13h for a rear-left air circuit 20a and a rear-right air circuit 20b. The rear height sensors 13g and 13h monitor height levels between the vehicle body and the rear-left and rear-right wheels 7 and 8 respectively to provide signals indicative thereof to the air suspension control unit 14. The air suspension control unit 14 is responsive to the signals from the rear height sensors 13g and 13h to carry out the program shown in FIGS. 3 or 4 to control height level difference between the rear wheels 7 and 8 as well as that between the front wheels 5 and 6 independently of each other. Additionally, the system may alternatively effect the pressure balancing control between the front-left and the rear-left wheels 5 and 7 and between the front-right and the rear-right wheels 6 and 8 independently of each other.

What is claimed is:

1. A height control system for a vehicle comprising:
   a first suspension unit including a first actuator for adjusting a vehicle height level between a vehicle body and a first wheel, the first actuator being adjustable by fluid pressure therein;
   a second suspension unit including a second actuator for adjusting a vehicle height level between the vehicle body and a second wheel, the second actuator being adjustable by fluid pressure therein;
   fluid power source means for supplying fluid pressure to the first and second actuators of said first and second suspension units;
   a first valve for controlling the fluid pressure supplied from said fluid power source means to the first actuator;
   a second valve for controlling the fluid pressure supplied from said fluid power source means to the second actuator;
   a fluid circuit connecting between said fluid power source and the first and second actuators, said fluid circuit including a fluid line communicating between the first and second actuators through said first and second valves;
   means for detecting a deactivated state of said power source means to provide a signal indicative thereof;
   sensor means for determining a height level difference between the first and second wheels to provide a signal indicative thereof; and
   control means responsive to the signals from said sensor means and said means for detecting a deactivated state of said power source means to provide first control signals to said first and second valves respectively to communicate between the first and second actuators balancing the fluid pressures in the first and second actuators when the height level difference is greater than a first threshold value within a first period of time following deactivation of said power source means, said control means further providing second control signals to the first and second valves to block the communication between the first and second actuators when the height level difference lower than a second threshold value which is smaller than the first threshold value is maintained for a second period of time.

2. A system as set forth in claim 1, wherein said control means provides the second control signals to the first and second valves to block the communication between the first and second actuators when the height level difference between the first and second wheels above a height level detected at the provision of the first control signals to the first and second valves is maintained for a third period of time.

3. A system as set forth in claim 1, wherein said control means provides the first control signals to the first and second valves when the height level difference greater than the first threshold value is maintained for a preselected period of time within the first period of time following the deactivation of said power source means.

* * * * *